(12) United States Patent
Bobay et al.

(10) Patent No.: US 6,479,916 B1
(45) Date of Patent: Nov. 12, 2002

(54) METHOD AND APPARATUS FOR MOUNTING ELECTRONIC MOTOR CONTROLS

(75) Inventors: Dennis P. Bobay, Ossian, IN (US); Michael W. Henry, Fort Wayne, IN (US); Peter B. Lytle, Fort Wayne, IN (US); Guy Bonner, Jr., Huntington, IN (US); Glen C. Young, Fort Wayne, IN (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/681,543

(22) Filed: Apr. 26, 2001

(51) Int. Cl.[7] .................................................. H02K 5/22
(52) U.S. Cl. ...................... 310/89; 310/42; 310/68 R; 310/71
(58) Field of Search .......................... 310/89, 42, 68 R, 310/71

(56) References Cited

U.S. PATENT DOCUMENTS

| | | | |
|---|---|---|---|
| 4,513,214 A | * 4/1985 | Dieringer | ..................... 310/71 |
| 4,668,898 A | 5/1987 | Harms et al. | |
| 4,716,326 A | * 12/1987 | Fisher | ........................ 310/89 |
| 4,999,530 A | 3/1991 | Azuma et al. | |
| 5,006,744 A | 4/1991 | Archer et al. | |
| 5,543,671 A | * 8/1996 | Williams | ..................... 310/71 |
| 5,711,065 A | 1/1998 | Asai et al. | |

* cited by examiner

Primary Examiner—Burton S. Mullins
(74) Attorney, Agent, or Firm—Karl A. Vick, Esq.; Armstrong Teasdale LLP

(57) ABSTRACT

A motor assembly includes a control sub-assembly configured to be mounted either remotely or integrally to a motor. The control sub-assembly includes a control housing, a control housing cover, electronic control components, and at least one sensing wire connected to the motor. The control housing cover includes a first attachment portion and a second attachment portion. The first attachment portion attaches the control housing cover to the control housing and the second attachment portion attaches the control housing cover to the motor. If the control sub-assembly is to be mounted remotely from the motor, the second attachment portion is not connected to the motor.

24 Claims, 3 Drawing Sheets

METHOD AND APPARATUS FOR MOUNTING ELECTRONIC MOTOR CONTROLS

BACKGROUND OF INVENTION

This invention relates generally to electronically controlled motors, and more particularly to mounting electronic controls for electronically controlled motors.

Electronically controlled motors are utilized in a number of applications and the electronic controllers for these motors are typically enclosed to prevent or reduce damage to controller components. However, motor controls and their enclosures occupy space and in some applications space is limited. Therefore, the motor controls in some applications are attached to the motor, and in other applications are mounted remotely from the motor.

It is desirable to use a single motor controller and motor controller mounting apparatus that can be either an integral part of the motor or remotely connected to the motor using common parts to minimize tooling, manufacturing, and inventory costs.

SUMMARY OF INVENTION

In an exemplary embodiment of the invention, an electronic controller is adapted to be mounted both remotely and integrally to a motor. The mounting configuration depends on the particular motor application. More specifically, a motor assembly includes the motor and a control sub-assembly. The control sub-assembly includes a control housing, a control housing cover, electronic control components mounted within a cavity formed by the control housing and the control housing cover, and sensing wires extending through the control housing cover and electrically connecting the electronic control components to the motor.

The control housing cover includes a first attachment portion and a second attachment portion. The first attachment portion attaches the control housing cover to the control housing and the second attachment portion attaches the control housing cover to the motor. If the control sub-assembly is to be mounted remotely from the motor, the second attachment portion is not connected to the motor.

The first attachment portion includes a first plurality of openings through which a first set of bolts extend. The bolts extend into a respective plurality of openings within the control housing and affix the control housing cover to the control housing. The second attachment portion includes a second plurality of openings through which a second set of bolts extend. The second set of bolts extend into a second respective plurality of openings within an end cap of the motor and affix the control housing cover thereto.

A single motor controller assembly is thus configured to be mounted directly to a motor or remotely from the motor using common parts which reduces tooling, manufacturing, and inventory costs.

DETAILED DESCRIPTION

Figure 1:
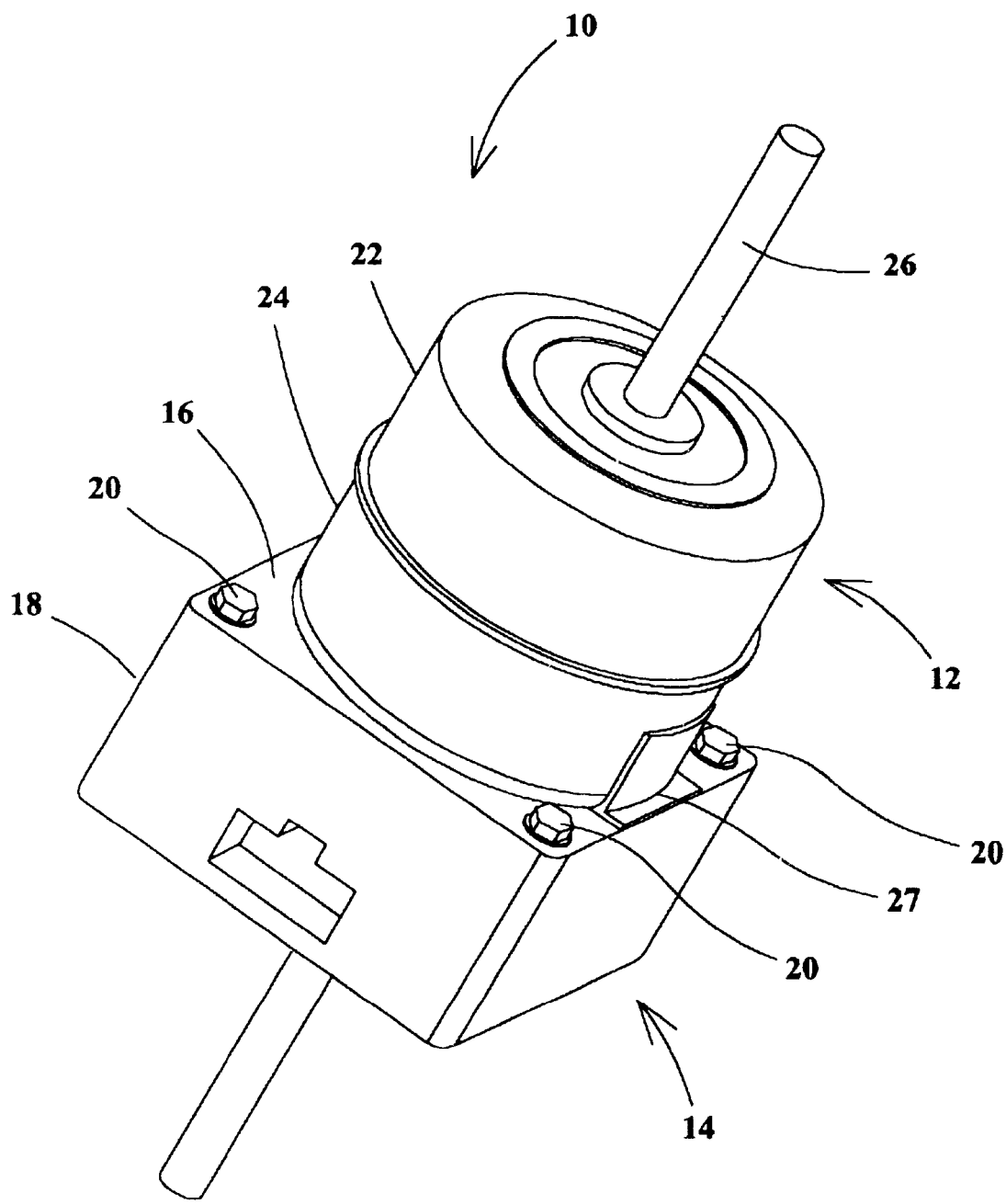
FIG. 1 is a perspective view of a motor assembly including a control sub-assembly directly connected to a motor.

FIG. 1 is a perspective view of a motor assembly 10 including a motor 12 mounted to a control sub-assembly 14. Control sub-assembly 14 includes a control housing cover, or lid, 16, a control housing 18, electronic control components (not shown in FIG. 1) and sensing wires (not shown in FIG. 1). The electronic control components are contained within a cavity formed by control housing cover 16 and control housing 18. In one embodiment, the electronic control components are control components for an 84 MM electronically controlled motor (ECM) and are commercially available from the General Electric Company, Schenectady, New York. In addition, the 84 MM ECM is commercially available from General Electric Company, Schenectady, New York. Control sub-assembly 14 also includes a plurality of attachment members 20 connecting control housing cover 16 to control housing 18. Motor 12 includes a rotor cup 22, an end cap 24, and a rotor shaft 26. Control housing cover 16 includes an opening (not shown) and end cap 24 includes an opening (not shown). The control housing cover opening and the end cap opening are configured such that when motor assembly 10 is assembled, the openings align with each other.

Motor assembly 10 also includes a grommet 27 that fits within the control housing cover opening and the end cap opening to seal the internal cavities and prevent contaminants from entering the openings. In one embodiment, grommet 27 is fabricated from rubber. In alternative embodiments, grommet 27 is fabricated from any resilient material.

Motor 12 further includes a stator (not shown) including a stator bore and a rotor core (not shown) including a bore therethrough. The rotor core is positioned at least partially with the stator bore. Rotor shaft 26 extends through the rotor core bore and through rotor cup 22 and end cap 24. Rotor shaft 26 also extends through control sub-assembly 14 which is mounted directly to motor 12 as will be described in greater detail below. Rotor cup 22 is mounted to rotor shaft 26 such that when rotor shaft 26 rotates, rotor cup 22 also rotates.

Figure 2:
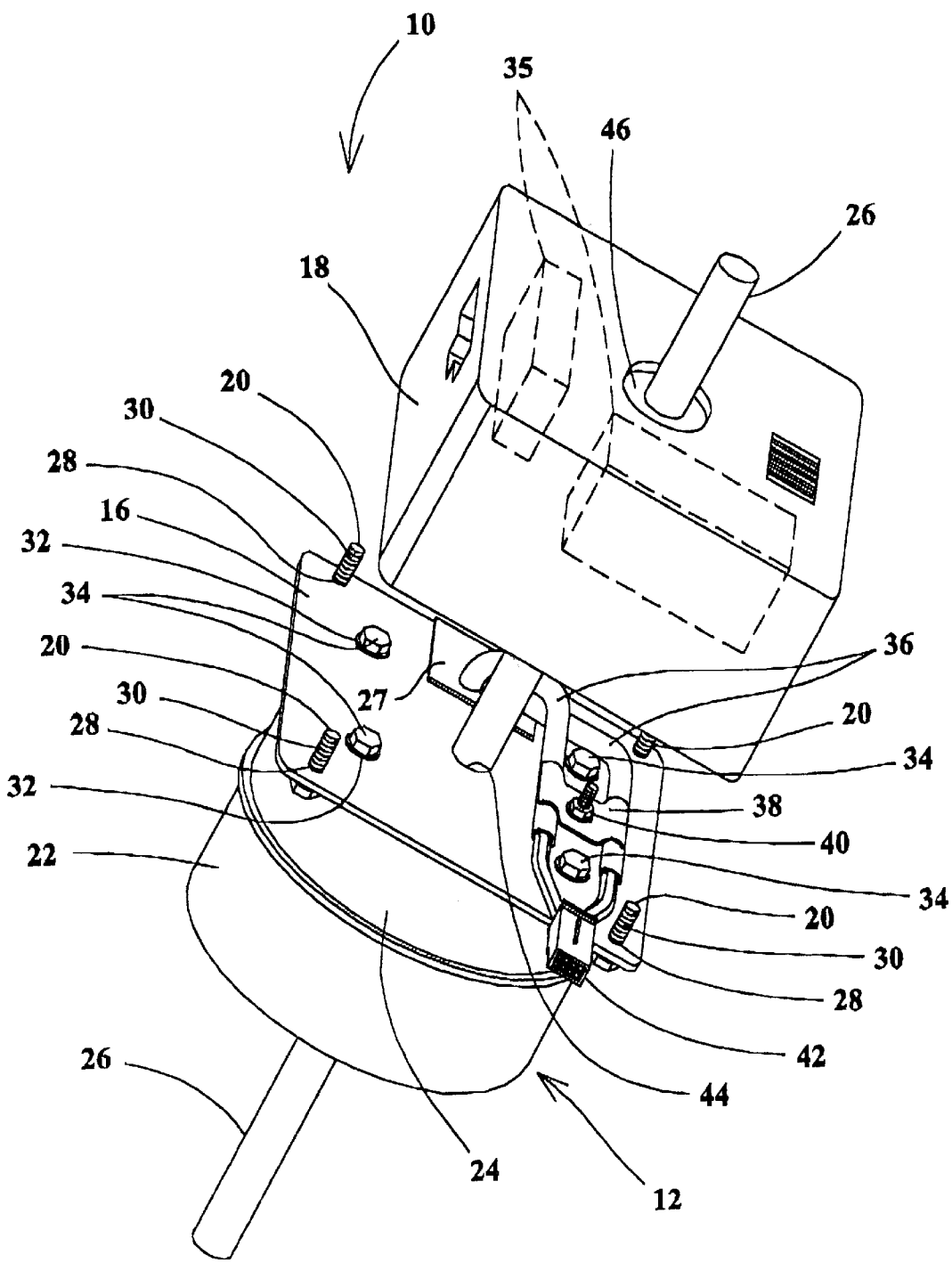
FIG. 2 is a partially exploded view of the motor assembly shown in FIG. 1.

FIG. 2 is a partially exploded view of motor assembly 10 illustrating control housing cover 16 attached to end cap 26 of motor 12. Control housing cover 16 includes a first plurality of openings 28 and attachment members 20 extend through control housing cover openings 28. In one embodiment, attachment members 20 are bolts having a threaded end 30 and control housing 18 includes a plurality of threaded openings (not shown). Threaded ends 30 extend into the control housing threaded openings and mate therewith. In alternative embodiments, attachment members 20 are any fastening devices capable of attaching control housing cover 16 to control housing 18.

Control housing cover 16 also includes a second plurality of openings 32 and a second set of attachment members 34. Attachment members 34 extend through control housing cover openings 32. In addition, motor end cap 24 includes a plurality of openings (not shown) and attachment members 34 extend into the motor end cap openings. In one embodiment, attachment members 34 are threaded bolts, motor end cap openings are threaded openings, and threaded bolts 34 extend into motor end cap openings and mate therewith. In alternative embodiments, attachment members 34 are any fastening devices capable of attaching control housing cover 16 to control housing 1 8.

In addition, control sub-assembly 14 (shown in FIG. 1) includes electronic control components 35 mounted to control housing 18. Two bundles of sensing wires 36 extend through grommet 27 and are held in a fixed relationship with control housing cover 16 with a mounting bracket 38.

Mounting bracket 38 is attached to control housing cover 16 with an attachment member 40. In one embodiment, attachment member 40 is a bolt extending through control housing cover 16, mounting bracket 38, and end cap 24. Wires 36 terminate at a connector 42 which attaches directly to the electronic control components 35. Wires 36 extend through grommet 27 which protects wires 36 from cuts by control housing cover 16. In an alternative embodiment, the wire opening includes a strain relief to protect wires 36 from cuts by Control housing cover 16 also includes a rotor shaft opening 44 extending therethrough. Rotor shaft opening 44 is located approximately at a center of control housing cover 16, second openings 32 are located approximately a first distance from the control housing cover center, and first openings 28 are located approximately a second distance from the control housing cover center. In one embodiment, the first distance is less than the second distance. In an alternative embodiment, the second distance is less than the first distance.

Motor assembly 10 is assembled by positioning rotor shaft 26 within rotor shaft opening 40 and sliding control housing cover 16 over rotor shaft 26 until control housing cover 16 is adjacent motor end cap 24. Second attachment members 34 are inserted into second openings 32 until they engage the motor end cap openings such that control housing cover 16 is fixedly attached to end cap 24. Control housing 18, which includes a rotor shaft opening 46, is positioned such that rotor shaft 26 extends through rotor shaft opening 46. Sensing wires 36 extending from motor 12 are attached to the electronic control components 35 such that the electronic control components 35 are electrically connected to motor 12. Control housing 18 is then slid over rotor shaft 26 until control housing 18 is adjacent control housing cover 16. First attachment members 20 are inserted through first openings 28 until they engage the control housing threaded openings such that control housing 18 is fixedly attached to control housing cover 16.

Figure 3:
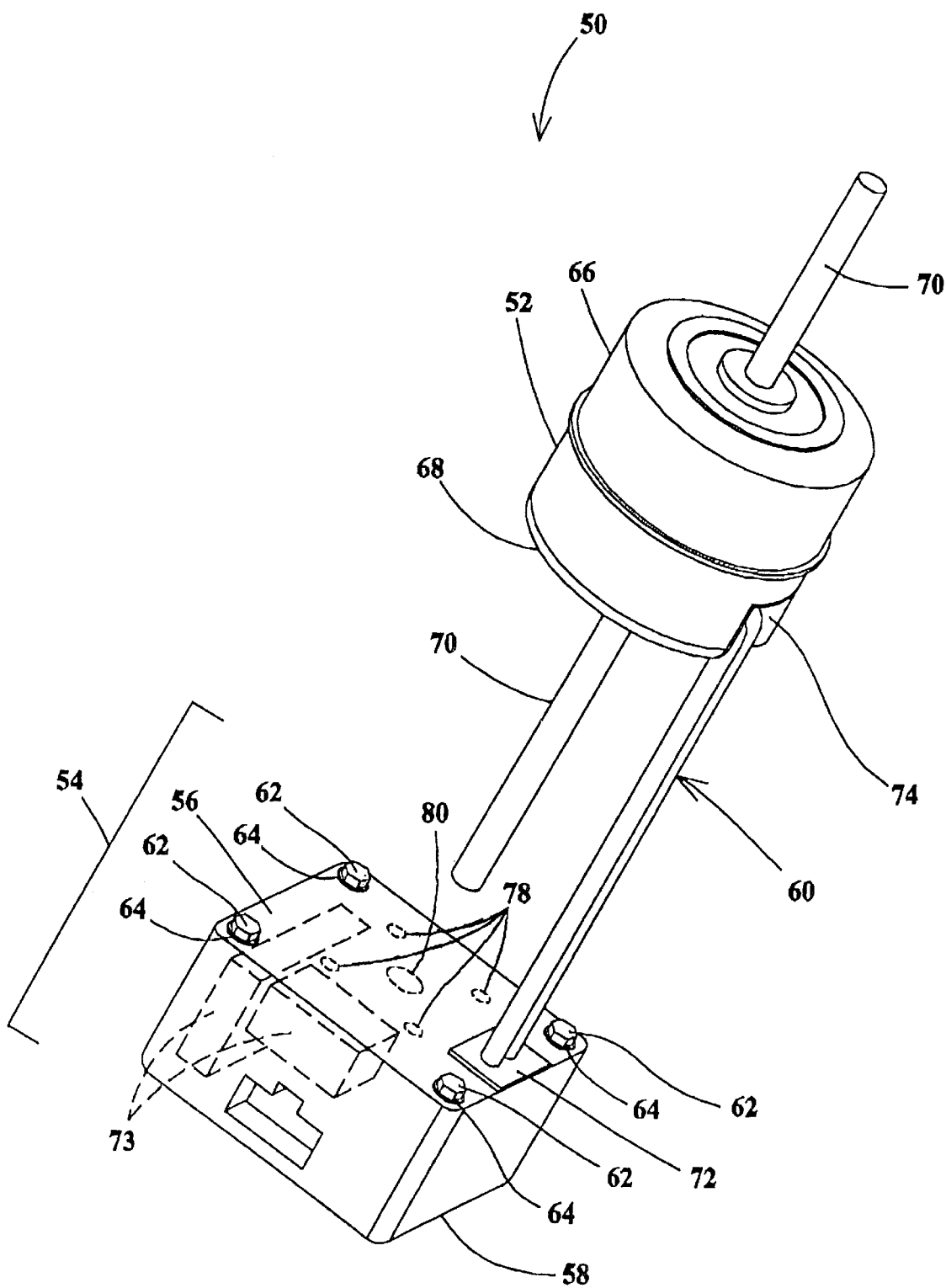
FIG. 3 is a perspective view of a motor assembly including a control sub-assembly remotely connected to a motor.

FIG. 3 is a perspective view of an alternative motor assembly 50 including a motor 52 and a control sub-assembly 54. In one embodiment, motor 52 is identical to motor 12 shown in FIG. 1. Control sub-assembly 54 includes a control housing cover, or lid, 56, a control housing 58, electronic control components 73 and two bundles of sensing wires 60. Control sub-assembly 54 also includes a plurality of attachment members 62 and attachment openings 64 for connecting control housing cover 56 to control housing 58. Motor 52 includes a rotor cup 66, an end cap 68, and a rotor shaft 70. Rotor shaft 70 extends through rotor cup 66 and end cap 68. Rotor shaft 70 does not extend through control sub-assembly 54. Sensing wires 60 extend through a grommet 72 positioned within a wire opening (not shown) of control housing cover 56 and are electrically coupled to electronic control components 73 located within control sub-assembly 54. Sensing wires 60 also extend through a second grommet 74 positioned within a wire opening (not shown) of end cap 68. In one embodiment, grommets 72 and 74 are fabricated from rubber. In an alternative embodiment, grommets 72 and 74 are fabricated from any suitable resilient material. Sensing wires 60 electrically connect the electronic control components 73 with motor 52.

Motor assembly 50 is assembled by positioning control housing cover 56 adjacent to control housing 58 and inserting attachment members 62 through attachment openings 64 until they engage the control housing threaded openings such that control housing 58 is fixedly attached to control housing cover 56. Sensing wires 60 are then connected to motor 52 such that the electronic control components 73 within control sub-assembly 54 are electrically connected to motor 52.

In one embodiment, control housing cover 56 is identical to control housing cover 16 except that control housing cover 56 does not include a set of second openings and a rotor shaft opening. For example, a stamped control housing cover is fabricated from stamped steel and includes partially-stamped areas for the second openings 78 and the rotor shaft opening 80. However, the stamping of the second openings 78 and the rotor shaft opening 80 do not extend entirely through control housing cover 56. The stamped control housing cover is thus usable with motor assembly 10 and motor assembly 50. To use the stamped control housing cover with motor assembly 10, the second openings 78 and the rotor shaft opening 80 must be opened by removing the blanks left therein. These blanks can be removed manually with the use of a punch or they can be removed mechanically with the use of an automated punching machine. To use the stamped control housing cover with motor assembly 50, nothing further needs to be done with the stamped control housing cover.

In an alternative embodiment, control housing cover 16 is fabricated separately from control housing cover 56. Control housing cover 16 is fabricated with second openings 32 and with rotor shaft opening 40. Control housing cover 56 is fabricated without second openings 78 and a rotor shaft opening 80.

While the invention has been described in terms of various specific embodiments, those skilled in the art will recognize that the invention can be practiced with modification within the spirit and scope of the claims.

What is claimed is:

1. A method for assembling an electronically controlled motor assembly including a motor and a controller sub-assembly, the motor including a rotor shaft and the controller sub-assembly including a control housing, a control housing cover, electronic control components, and at least one sensing wire, the control housing cover including a first attachment portion and a second attachment portion, said method comprising:

attaching the control housing cover including a plurality of partially-stamped openings to the control housing utilizing a plurality of attachment members extending through the first attachment portion; and attaching the sensing wire to the motor, wherein the motor includes a plurality of attachment openings.

2. A method in accordance with claim 1 wherein assembling an electronically controlled motor further comprises connecting the motor to the controller sub-assembly in at least one of a remote configuration and an integrated configuration with respect to the motor.

3. A method in accordance with claim 2 wherein mounting the control sub-assembly in a remote configuration comprises:

aligning the control housing cover adjacent to the control housing;

attaching the control housing cover to the control housing; and connecting the sensing wire to the motor such that an electrical connection is made between the motor and the control sub-assembly.

4. A method in accordance with claim 3 wherein attaching the control housing cover further comprises inserting a plurality of attachment members through a plurality of attachment openings until the attachment members engage a plurality of control housing openings.

5. A method in accordance with claim 2 wherein mounting the control sub-assembly in an integrated configuration comprises:
connecting the sensing wire to the motor such that an electrical connection is made between the motor and the control sub-assembly;
aligning the control housing cover adjacent to the control housing;
inserting the rotor shaft through the control housing cover and the control housing;
attaching the control housing cover to the control housing; and
attaching the control sub-assembly to the motor.

6. A method in accordance with claim 5 wherein connecting the sensing wire further comprises connecting a first sensing wire to the motor and connecting a second sensing wire to an electronic control component within the control sub-assembly.

7. A method in accordance with claim 5 wherein inserting the motor shaft through the control housing cover further comprises sliding the housing cover over the rotor shaft until the housing cover is adjacent to a motor end cap.

8. A method in accordance with claim 5 wherein inserting the motor shaft through the control housing cover further comprises inserting the rotor shaft through the control housing cover and the control housing until the rotor shaft extends through the control sub-assembly.

9. A method in accordance with claim 5 wherein attaching the control housing cover further comprises inserting a plurality of attachment members through a plurality of attachment openings until the attachment members engage a plurality of control housing openings.

10. A method in accordance with claim 5 wherein aligning the control housing cover adjacent to the control housing further comprises removing partially-stamped areas from a stamped control housing cover.

11. An electronically controlled motor assembly comprising a motor and a control sub-assembly, said control sub-assembly comprising:
a control housing;
a control housing cover including a plurality of partially-stamped openings attached to said control housing, said cover comprising a first attachment portion and a second attachment portion;
a first plurality of attachment members extending through said control housing cover first attachment portion and engaging said control housing; and
a sensing wire electrically connecting electronic control components contained within said control sub-assembly with said motor.

12. An assembly in accordance with claim 11 wherein said first attachment portion comprises openings stamped through said control housing cover.

13. An assembly in accordance with claim 11 wherein said second attachment portion comprises openings stamped only partially through said control housing cover.

14. An assembly in accordance with claim 13 wherein said motor comprises a plurality of openings having a same configuration as said second attachment portion partially stamped openings.

15. An assembly in accordance with claim 11 wherein said second attachment portion comprises openings stamped entirely through said control housing cover.

16. An assembly in accordance with claim 15 wherein said motor comprises a plurality of openings adjacent said second attachment portion openings, said motor assembly further comprising a second plurality of attachment members extending through said control housing cover second attachment portion openings and engaging said motor.

17. An assembly in accordance with claim 11 wherein said sensing wire extends through a sensing wire opening in said control housing cover.

18. A control assembly for an electronically controlled motor, said assembly comprising:
a control housing;
a control housing cover including a plurality of partially-stamped openings attached to said control housing, said cover comprising a first attachment portion and a second attachment portion;
a first plurality of attachment members extending through said control housing cover first attachment portion and engaging said control housing; and
a sensing wire configured to electrically connect electronic control components contained within said control assembly with the motor.

19. A control assembly in accordance with claim 18 wherein said first attachment portion comprises openings stamped through said control housing cover.

20. A control assembly in accordance with claim 18 wherein said second attachment portion comprises openings stamped only partially through said control housing cover.

21. A control assembly in accordance with claim 20 wherein said motor comprises a plurality of openings having a same configuration as said second attachment portion partially stamped openings.

22. A control assembly in accordance with claim 18 wherein said second attachment portion comprises openings stamped entirely through said control housing cover.

23. A control assembly in accordance with claim 22 wherein said motor comprises a plurality of openings adjacent said second attachment portion openings, said motor assembly further comprising a second plurality of attachment members extending through said control housing cover second attachment portion openings and engaging said motor.

24. A control assembly in accordance with claim 18 wherein said sensing wire extending through a sensing wire opening in said control housing cover.

* * * * *